US010377567B1

(12) United States Patent
Jones

(10) Patent No.: US 10,377,567 B1
(45) Date of Patent: Aug. 13, 2019

(54) RECYCLING CONTAINER

(71) Applicant: Darius Jones, Cordova, TN (US)

(72) Inventor: Darius Jones, Cordova, TN (US)

( * ) Notice: Subject to any disclaimer, the term of this patent is extended or adjusted under 35 U.S.C. 154(b) by 0 days.

(21) Appl. No.: 16/011,580

(22) Filed: Jun. 18, 2018

(51) Int. Cl.
| *B65F 1/14* | (2006.01) |
| *B65F 1/16* | (2006.01) |
| *B62B 5/06* | (2006.01) |
| *B62B 1/24* | (2006.01) |
| *B65F 1/00* | (2006.01) |

(52) U.S. Cl.
CPC ............ *B65F 1/1615* (2013.01); *B62B 1/24* (2013.01); *B62B 5/06* (2013.01); *B65F 1/006* (2013.01); *B65F 1/1468* (2013.01); *B62B 2202/20* (2013.01); *B62B 2205/20* (2013.01); *B65F 2001/1653* (2013.01); *B65F 2210/181* (2013.01)

(58) Field of Classification Search
CPC .... B65F 1/1615; B65F 1/1607; B65F 1/1468; B65F 1/006; B65F 1/1405; B65F 1/1473; B65F 2001/1653; B65F 2001/1669; B65F 2210/181; B65F 2210/152; B62B 1/24; B62B 5/06; B62B 2202/20; B62B 2205/20
USPC ....................................................... 280/47.17
See application file for complete search history.

(56) References Cited

U.S. PATENT DOCUMENTS

| 4,834,253 A | 5/1989 | Crine |
| D304,873 S | 11/1989 | Ruehland |
| 4,974,746 A * | 12/1990 | Dickinson ............... B65F 1/004 209/702 |
| D314,512 S | 2/1991 | Mazzarisi et al. |
| 5,028,099 A | 7/1991 | Bertucco |
| 5,050,768 A | 9/1991 | Alden |
| D324,593 S | 3/1992 | Kouwenhoven |
| D326,345 S | 5/1992 | Mandell et al. |
| 5,118,037 A | 6/1992 | Ekegren |
| D327,757 S | 7/1992 | Kouwenhoven |
| 5,129,543 A | 7/1992 | White |
| 5,152,420 A | 10/1992 | Bird et al. |
| 5,294,017 A | 3/1994 | Li |
| 5,449,085 A | 9/1995 | Brun, Jr. |
| 5,601,203 A | 2/1997 | Brun, Jr. |
| 5,706,971 A * | 1/1998 | Taylor ..................... B65F 1/004 220/523 |
| 5,738,236 A | 4/1998 | Brun, Jr. |
| 6,290,093 B1 * | 9/2001 | Obriot .................... B65F 1/1615 220/324 |
| 6,550,792 B1 | 4/2003 | Salmon et al. |
| D590,119 S | 4/2009 | Swick |
| 8,302,916 B2 * | 11/2012 | Dembowiak ......... B65F 1/0073 220/495.08 |
| 8,807,579 B2 * | 8/2014 | Lin .......................... B62B 1/16 280/47.131 |
| D727,584 S | 4/2015 | Busch |
| 9,051,119 B2 * | 6/2015 | Jarrett ................... B65F 1/0046 |
| 9,114,931 B2 | 8/2015 | Spahmann |
| 9,682,819 B2 | 6/2017 | Reeb |

(Continued)

*Primary Examiner* — John D Walters
(74) *Attorney, Agent, or Firm* — David J. Kreher

(57) ABSTRACT

A recycling container with holes and slots that allow materials to be inserted one at a time into the container in an attempt to prevent non-recyclable material from being inserted into the recycling container. The recycling container further comprises a locking mechanism to restrict opening, and possibly wheels, a method of preventing materials from being withdrawn from the recycling container, a shelf to separate types of materials, and a drain.

16 Claims, 6 Drawing Sheets

(56) References Cited

U.S. PATENT DOCUMENTS

| | | |
|---|---|---|
| 9,828,177 B2 * | 11/2017 | Nussbaum .......... E05B 15/0093 |
| 9,842,292 B1 | 12/2017 | Miller |
| 9,873,560 B2 | 1/2018 | Spahmann |
| 9,888,159 B2 | 2/2018 | Loh |
| 9,888,160 B2 | 2/2018 | Loh |
| 2015/0321842 A1 | 11/2015 | Spahmann |
| 2016/0311615 A1 | 10/2016 | Fahrenkrug |
| 2017/0297817 A1 | 10/2017 | Reeb |

* cited by examiner

RECYCLING CONTAINER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

FIELD OF THE INVENTION

Recycling is an attempt to preserve natural resources and slow the filling of landfills. However, when on-recyclable material is included in with recyclable material the recyclable material is contaminated, not as easily recycled, not as valuable, and may even need to be disposed of in a landfill. The present invention attempts to reduce contamination within the recyclables, reduce complaints by recyclers to collection companies because of the contamination, reduce the rate at which landfills are filled, reduce overall expense of collection, provide a cleaner recyclable product to sell, increase material recovery facility production and reduce costs as a result of contamination, reduce transportation costs by not having to dispose of contamination, increase the amount of material that is recycled, protect home owners from theft of personal information, eliminate scavenging from recycling containers, and maximize recycling capacity by restricting the materials disposed of in the recycling container by controlling the size of the materials to be recycled and by restricting the rate at which materials are inserted into the recycling container to one item at a time.

BACKGROUND OF THE INVENTION

Recycling containers are being used nationally in an attempt to help preserve the environment and natural resources. However, when non-recyclable material is included with recyclable material, the recyclable material is contaminated and therefore not as easily recycled and not as valuable. This may even lead to the contaminated recyclables being disposed of in landfills. The present invention attempts to prevent non-recyclable material from being included with recyclable material by restricting how materials can be inserted into the recycling container. Holes are included so that recyclable plastics and glass are inserted one at a time through the top. A slot is included to restrict the size of paper and cardboard materials. A locking mechanism is included to prevent the top of the recycling container from being opened and allowing the recycling container to be used as another garbage container.

SUMMARY OF THE INVENTION

The present disclosure reveals a recycling container to aid in preventing contamination, or rather, non-recyclable material from being included into the recycling container. The recycling container is a container with a lid a plurality of holes in the top of the recycling container, in the shape of recyclable material, and a slot in the side or the top of the recycling container for inserting paper and cardboard.

There are several features that can also be included in the recycling container such as wheels to make the recycling container easier to move, a locking mechanism to prevent the top from being opened and thereby allow indiscriminate dumping into the recycling container. The locking mechanism may further be activated by the orientation of the recycling container, such that, when the recycling container is inverted, the locking mechanism is disengaged to allow recycling material to be emptied from the recycling container.

Another feature involves a restriction mechanism with the holes that allows material to be inserted but prevents material from being brought back through the hole or slot.

A fourth feature involves a shelf inside the recycling container that separates recyclables inserted through the top from paper and cardboard inserted through the slot.

A fifth feature involves a drain in the bottom of the recycling container that allows water and other liquids to drain from the recycling container.

AMENDED DETAILED DESCRIPTION OF THE INVENTION

Figure 1:
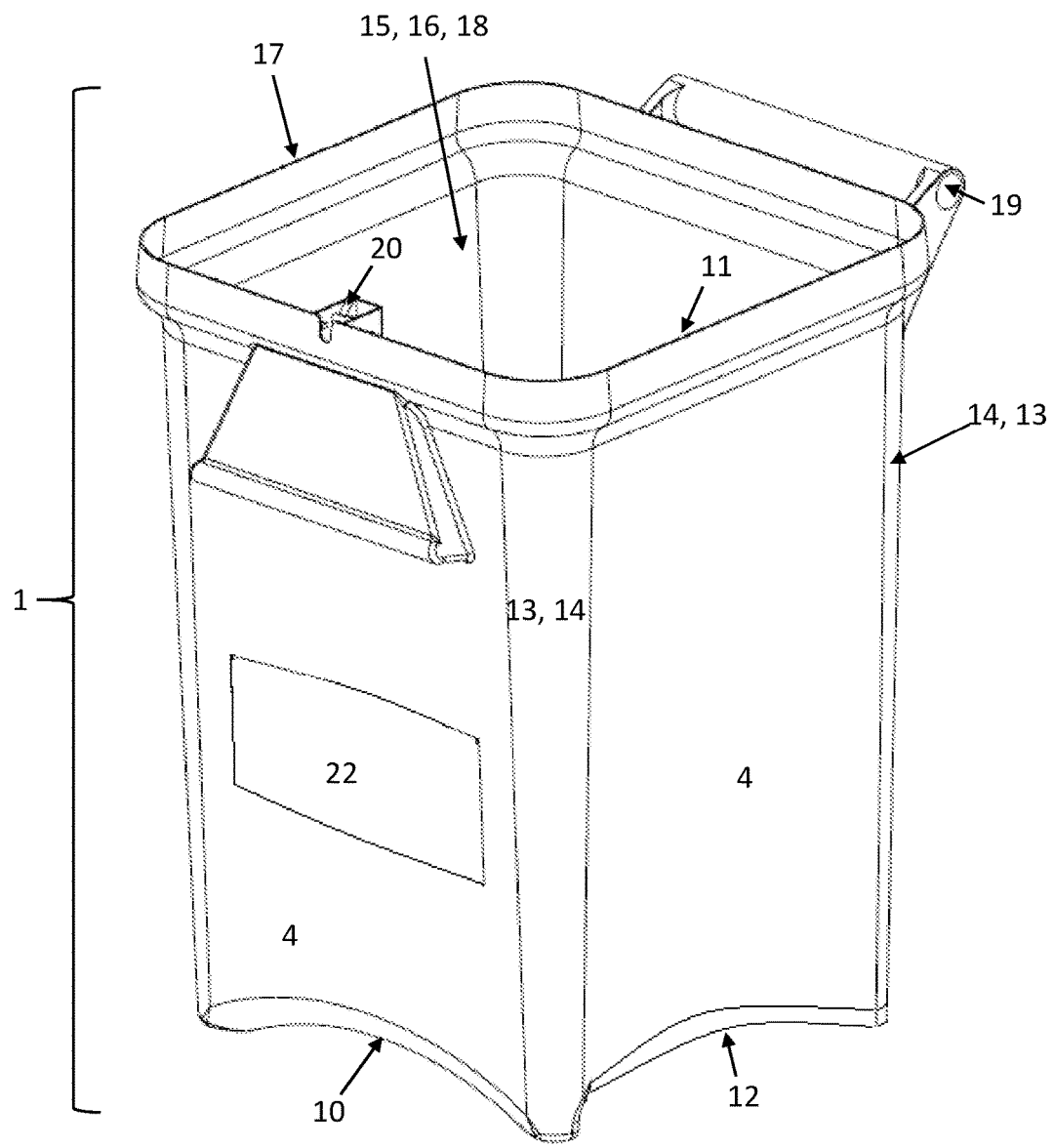
FIG. 1 Recycling container.
Figure 2:
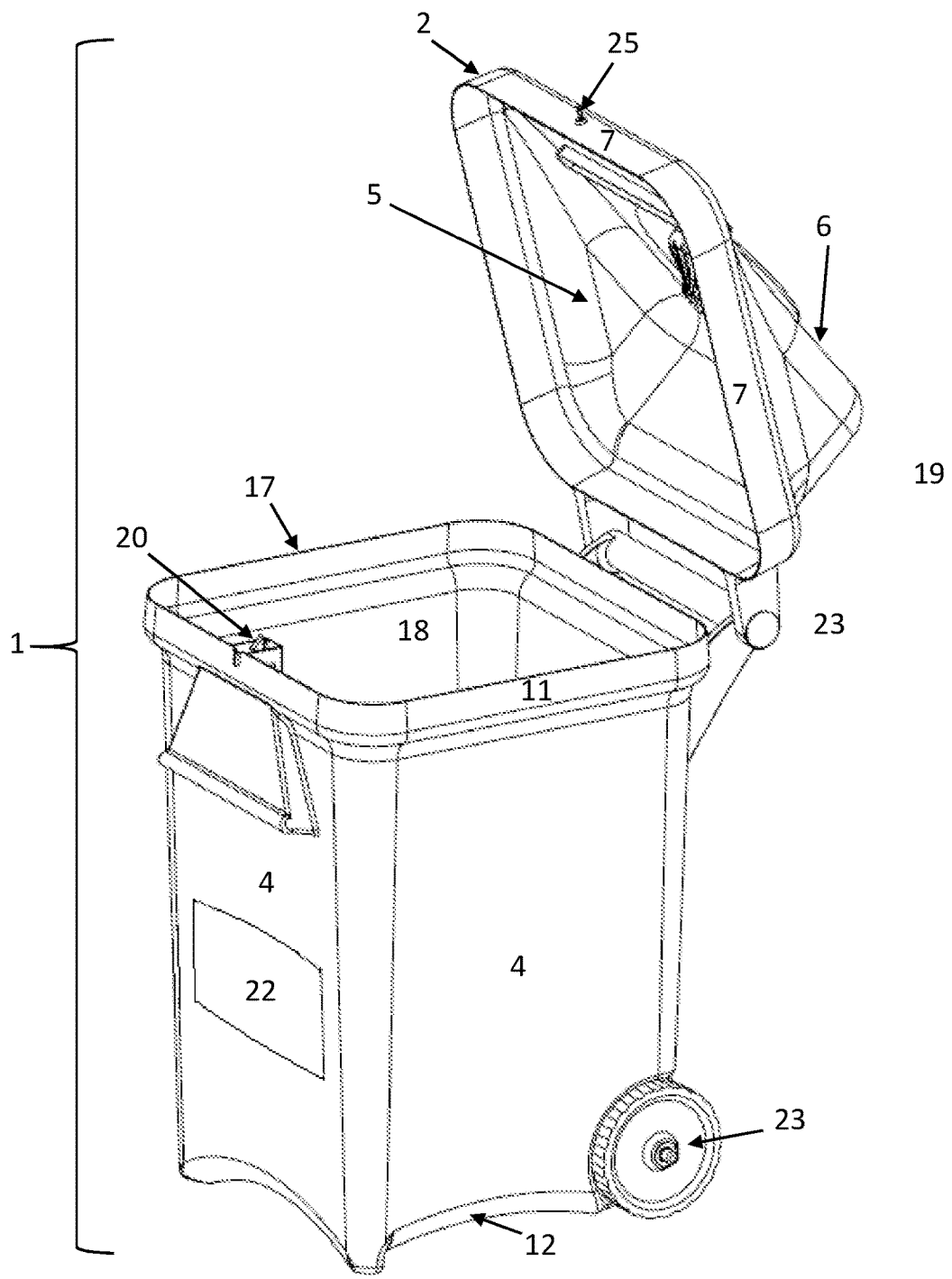
FIG. 2 recycling container including wheels.
Figure 3:
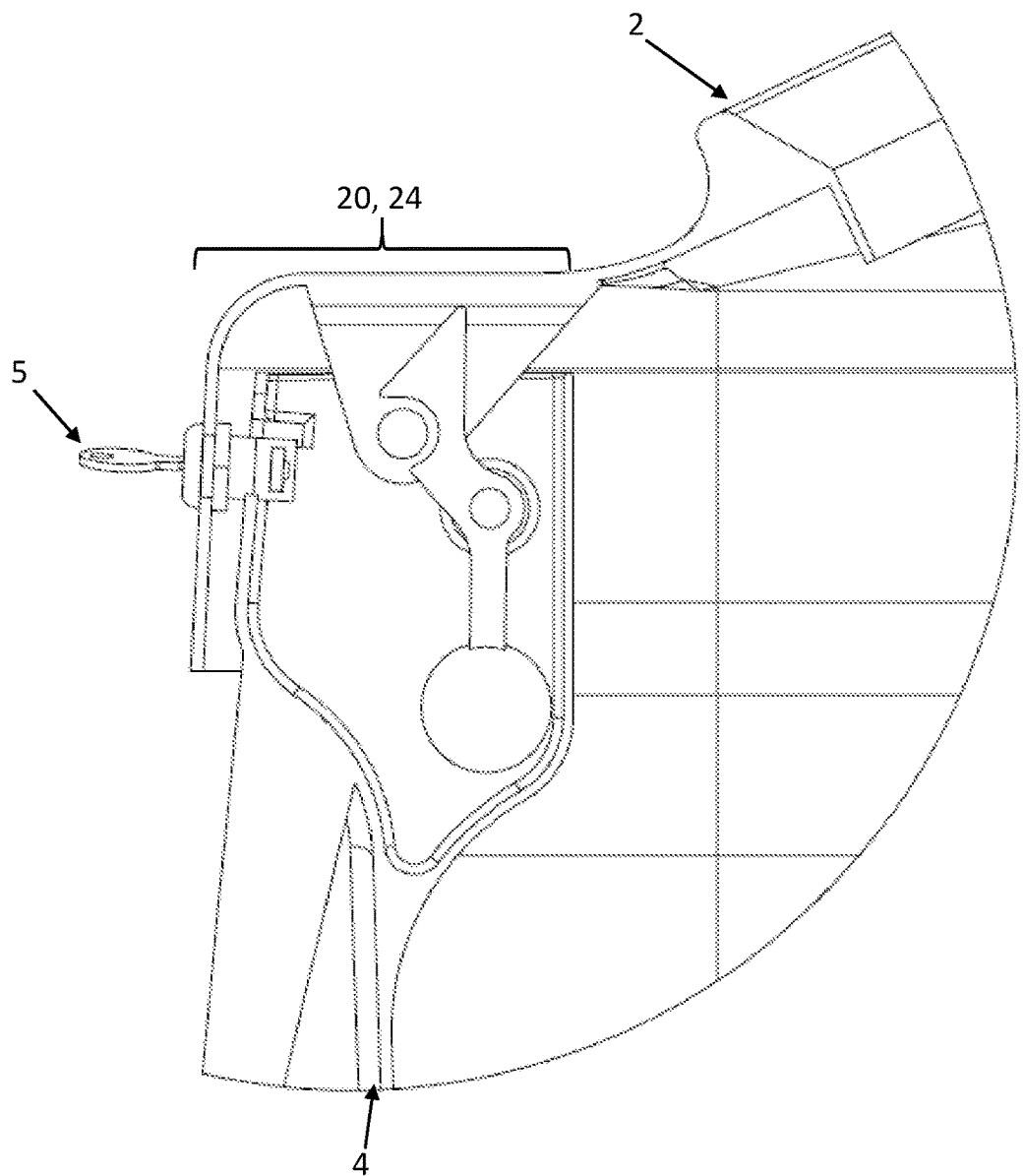
FIG. 3 is a view of the gyroscopic locking mechanism and includes a key release mechanism.
Figure 4:
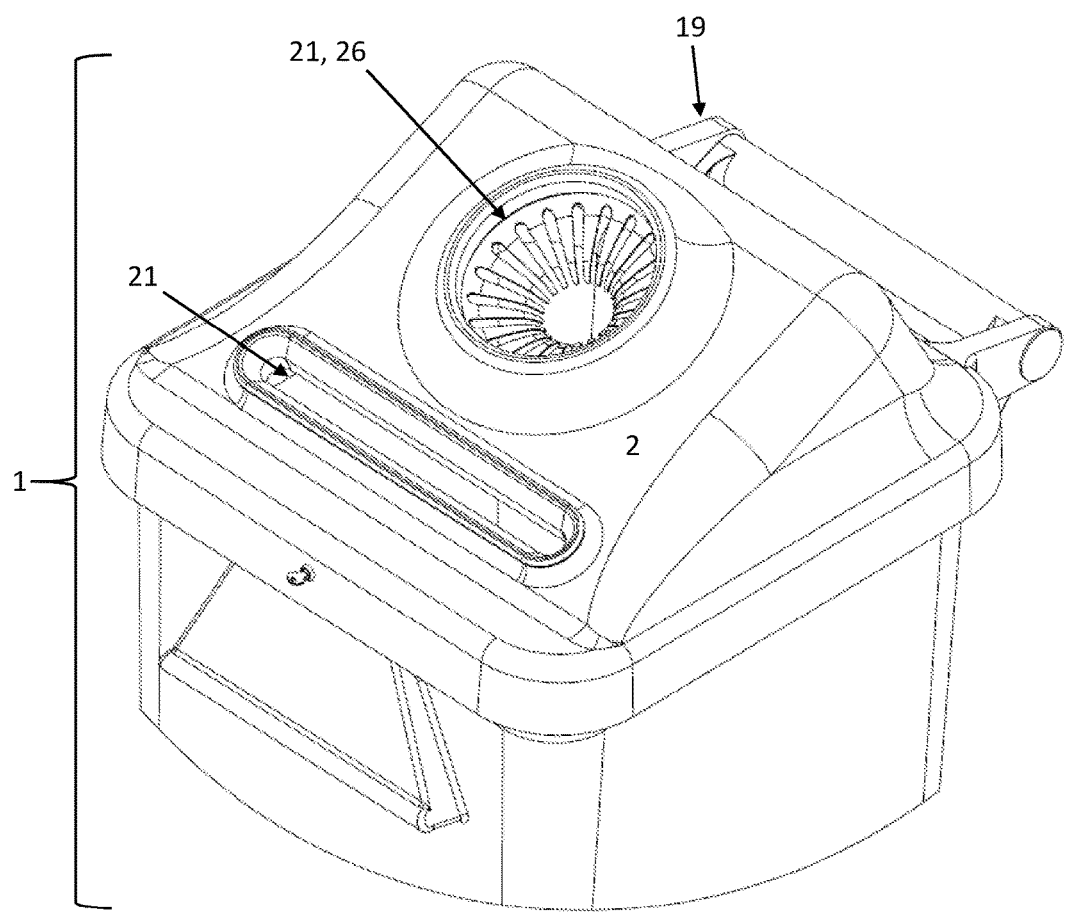
FIG. 4 Is a view of the top of the recycling container including the restrictors.
Figure 5:
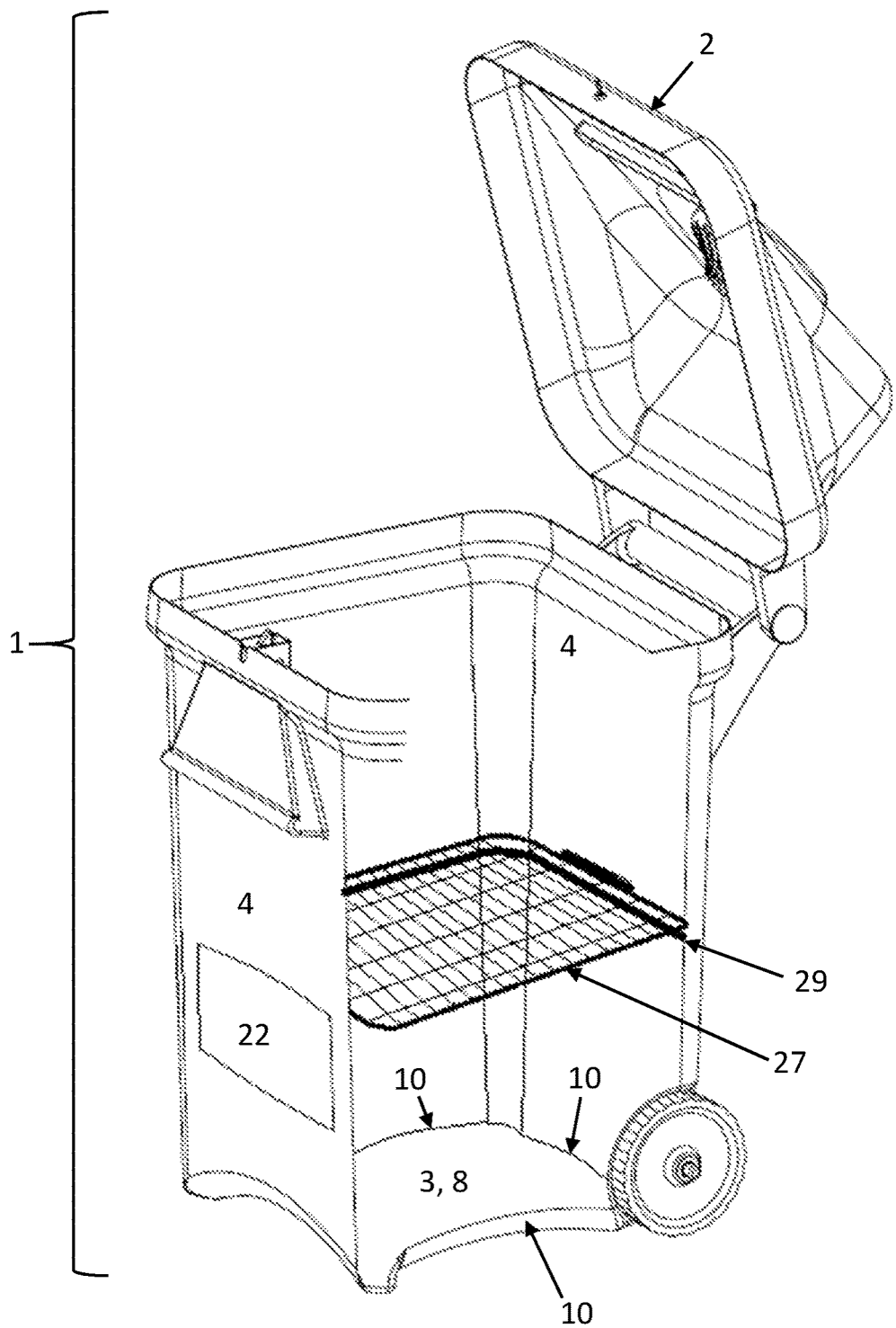
FIG. 5 is a cut away view of the recycling container displaying the shelf and lip.
Figure 6:
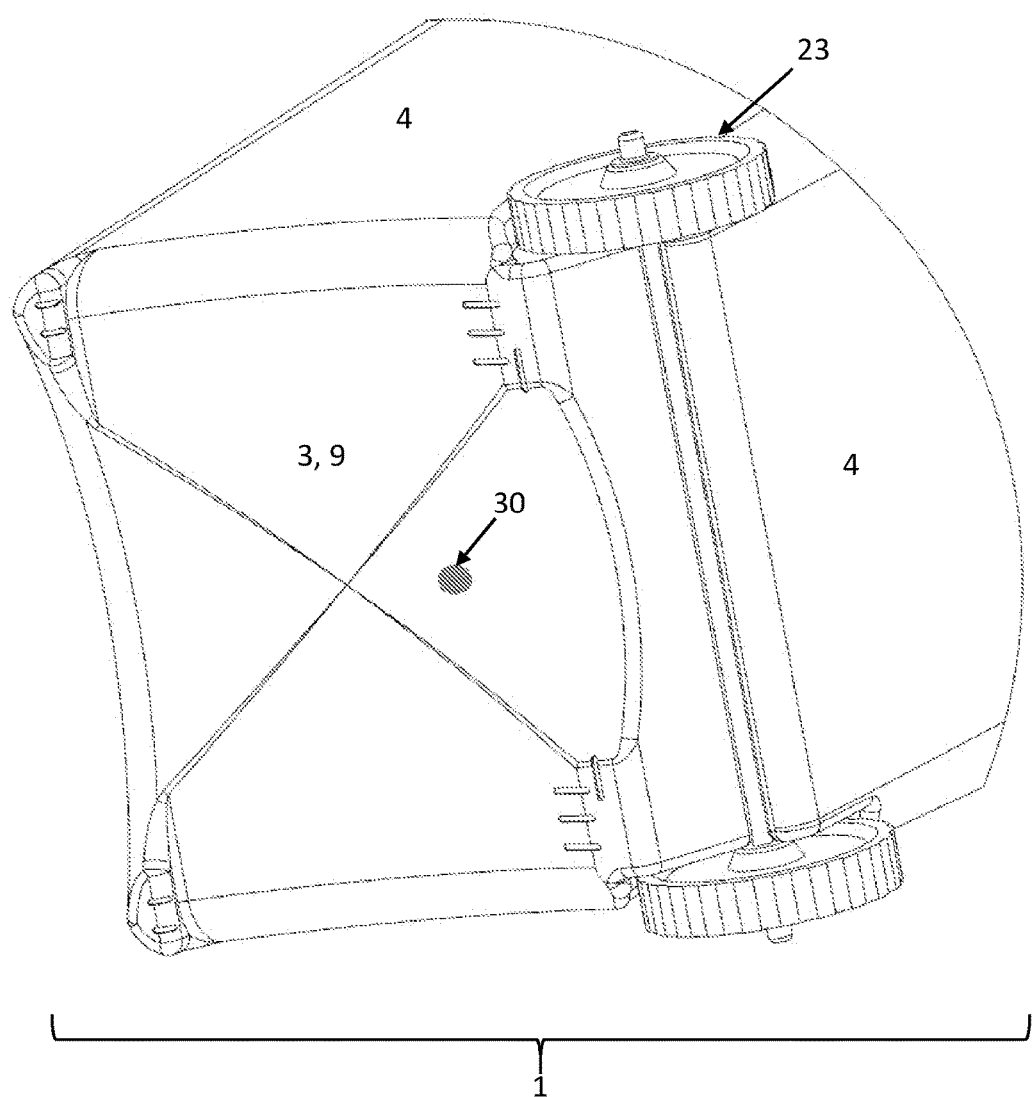
FIG. 6 is a view of the bottom of the recycling container including the drain.

The present disclosure reveals a recycling container 1 to aid in preventing contamination of the recycling within the container with non-recyclable material, said recycling container 1 comprising a top 2, a bottom 3, and a plurality of sides 4, said plurality of sides 4 being defined as at least one side. The top 2 comprising an inside 5, an outside 6, and a plurality of edges 7, said plurality of edges 7 being defined as at least one edge 7, said plurality of edges 7 further equal to the number of sides of the plurality of sides 4. The bottom 3 comprising an inside 8, an outside 9, and a plurality of edges 10, said plurality of edges 10 being defined as at least one edge 10, said plurality of edges 10 equal to the number of sides 4 of the plurality of sides 4. Each side of the plurality of sides 4 has a top edge 11, a bottom edge 12, a left edge 13, and a right edge 14.

The left edge 13 of each side 4 of the plurality of sides 4 is attached to the right edge 14 of the adjacent side 4 of the plurality of sides 4 such that the total number of the plurality of sides 4 forms an enclosure 15. Each edge 7 of the plurality of edges 7 of the bottom 3 is attached to a bottom edge 10 of each side 4 of the plurality of sides 4 such that the plurality of sides 4 and the bottom form a container 16. The container 16 comprising an outside 17 and an inside 18. Along the top edge 11 of one of the sides 4 of the plurality of sides 4 is a hinge mechanism 19 that attaches to one of the edges 7 of the plurality of edges 7 of the top 2 such that the top 2 can be raised and lowered while still being attached to the side 4. In the top 2, on the top edge 11 opposite the edge 11 with the hinge mechanism 19, there is a locking mechanism 20, said locking mechanism 20 locking the top 2 of the recycling container 1 to the corresponding side 4 of the plurality of sides 4 so that the recycling container 4 cannot be opened without unlocking the locking mechanism 20.

The top 2 comprises a plurality of holes 21, wherein the plurality holes 21 is defined as at least one hole 21. Said plurality of holes 21 passing through the outside 6 and into the inside 8 and being in the shape of a recyclable material including but not limited to a can, bottle, or milk jug. In one of the sides 4 of the plurality of sides 4 or the top 2 is a slot 22, said slot 22 designed to allow paper or cardboard to pass through from outside 17 the container 16 into the inside 18 of the container 16.

One feature of the recycling container 1 is that the recycling container 1 further comprises wheels 23, wherein the wheels 23 are located near the bottom 3 and attached to sides 4 of the plurality of sides 4 in such a fashion so as to be perpendicular to the hinge mechanism 19 such that, when the recycling container 1 is tipped, the wheels 23 facilitate the rolling of the recycling container 1.

A second feature of the recycling container 1 involves the locking mechanism 20, wherein the locking mechanism 20 is further comprised of a gyroscopic locking mechanism 24 such that, when the recycling container 1 is inverted, the gyroscopic locking mechanism 24 releases the top 2 to allow the recycling container 1 to open and the top 2 to pivot on the hinge mechanism 19. This gyroscopic locking mechanism 24 may also have a key release 25 to allow the gyroscopic locking mechanism 24 to be released when the recycling container 1 is not inverted.

A third feature of the recycling container 1 is a plurality of restrictors 26, wherein a plurality of restrictors 26 is defined as at least one restrictor 26, and each restrictor 26 of the plurality of restrictors 26 is positioned on the inside 18 of the recycling container 1, covering a hole 21 of the plurality of holes 21 or the slot 22, and allows recycling material to be passed through the hole 21 or slot 22 but prevents the recycling material from being extracted once inserted into the recycling container 1.

A fourth feature of the recycling container 1 involves a shelf 27 located on the inside 18 of the recycling container 1. Said shelf 27 is attached to a side 4 of the plurality of sides 4 by a hinge 28 and positioned above the positioning of the slot 22 to separate the recycling material inserted through the top 2 from the recycling material inserted through the slot 22. Also, on the inside 18 of the recycling container 1 is a lip 29, such that, when the shelf 27 is perpendicular to the side 4 of the plurality of sides 4, the shelf 27 rests on the lip 29. When the recycling container 1 is inverted, the shelf 27 pivots on the hinge 28 to allow the recycling below the shelf 27 to be emptied from the recycling container 1.

A fifth feature of the recycling container 1 is a drain hole 30, located in the bottom 3 of the recycling container 1 to allow rain water and liquids to drain from the recycling container 1.

Each of the feature can be included individually with the basic design of the recycling container 1 or in combination with some or all of the other features.

What is claimed:

1. A recycling container to aid in preventing contamination of the recycling within the container with non-recyclable material, said recycling container comprising:
    a top, a bottom, and a plurality of sides:
    the top comprising an inside, an outside, and a plurality of edges, said plurality of edges equal to the number of sides of the plurality of sides;
    the bottom comprising an inside, an outside, and a plurality of edges, said plurality of edges equal to the number of sides of the plurality of sides;
    each side of the plurality of sides has a top edge, a bottom edge, a left edge, and a right edge;
    the left edge of each side of the plurality of sides is attached to the right edge of the adjacent side of the plurality of sides such that the total number of the plurality of sides forms an enclosure;
    each edge of the plurality of edges of the bottom is attached to a bottom edge of each side of the plurality of sides such that the plurality of sides and the bottom form a container;
    the container comprising an outside and an inside;
    along the top edge of one of the sides of the plurality of sides is a hinge mechanism that attaches to one of the edges of the plurality of edges of the top such that the top can be raised and lowered while still being attached to the side;
    in the top, on the edge opposite the edge with the hinge mechanism, there is a locking mechanism, said locking mechanism locking the top of the recycling container to the corresponding side of the plurality of sides so that the recycling container cannot be opened without unlocking the locking mechanism;
    the top further comprising a plurality of holes, wherein the plurality holes is defined as at least one hole;
    said plurality of holes passing through the outside and into the inside and being in the shape of a recyclable material;
    in at least one of one of the sides of the plurality of sides or the top is a slot, said slot designed to allow paper or cardboard to pass through from outside the container into the inside of the container
    a shelf and a lip located on the inside of the recycling container;
    said shelf is attached to a side of the plurality of sides by a hinge and positioned above the positioning of the slot to separate the recycling material inserted through the top from the recycling material inserted through the slot;
    the lip is positioned along the inside of the recycling container along the plurality of sides, such that, when the shelf is perpendicular to the side of the plurality of sides, the shelf rests on the lip; and
    when the recycling container is inverted, the shelf pivots on the hinge to allow the recycling below the shelf to be emptied from the recycling container.

2. The recycling container of claim 1 wherein the recycling container further comprises wheels, wherein the wheels are located near the bottom and attached to sides of the plurality of sides in such a fashion so as to be perpendicular to the hinge mechanism such that, when the recycling container is tipped, the wheels facilitate the rolling of the recycling container.

3. The recycling container of claim 2 wherein the locking mechanism further comprises a gyroscopic locking mechanism such that, when the recycling container is inverted the locking mechanism releases the top to allow the top to open and to pivot on the hinge mechanism; and
    wherein the gyroscopic locking mechanism further comprises the ability to also open the locking mechanism with a key.

4. The recycling container of claim 3 wherein the recycling container further comprises a plurality of restrictors, wherein a plurality of restrictors is defined as at least one restrictor, and each restrictor of the plurality of restrictors is positioned on the inside of the recycling container, covering a hole of the plurality of holes or the slot, and allows recycling material to be passed through the hole or slot but prevents the recycling material from being extracted once inserted into the recycling container.

5. The recycling container of claim 3 wherein the recycling container further comprises a drain hole, said drain hole being located in the bottom of the recycling container to allow rain water and liquids to drain from the recycling container.

6. The recycling container of claim 3 wherein the recycling container further comprises a drain hole, said drain hole being located in the bottom of the recycling container to allow rain water and liquids to drain from the recycling container.

7. The recycling container of claim 2 wherein the recycling container further comprises a plurality of restrictors, wherein a plurality of restrictors is defined as at least one restrictor, and each restrictor of the plurality of restrictors is positioned on the inside of the recycling container, covering a hole of the plurality of holes or the slot, and allows recycling material to be passed through the hole or slot but prevents the recycling material from being extracted once inserted into the recycling container.

8. The recycling container of claim 7 wherein the recycling container further comprises a drain hole, said drain hole being located in the bottom of the recycling container to allow rain water and liquids to drain from the recycling container.

9. The recycling container of claim 2 wherein the recycling container further comprises a drain hole, said drain hole being located in the bottom of the recycling container to allow rain water and liquids to drain from the recycling container.

10. The recycling container of claim 1 wherein the locking mechanism further comprises a gyroscopic locking mechanism such that, when the recycling container is inverted the locking mechanism releases the top to allow the top to open and to pivot on the hinge mechanism; and wherein the gyroscopic locking mechanism further comprises the ability to also open the locking mechanism with a key.

11. The recycling container of claim 10 wherein the recycling container further comprises a plurality of restrictors, wherein a plurality of restrictors is defined as at least one restrictor, and each restrictor of the plurality of restrictors is positioned on the inside of the recycling container, covering a hole of the plurality of holes or the slot, and allows recycling material to be passed through the hole or slot but prevents the recycling material from being extracted once inserted into the recycling container.

12. The recycling container of claim 10 wherein the recycling container further comprises a drain hole, said drain hole being located in the bottom of the recycling container to allow rain water and liquids to drain from the recycling container.

13. The recycling container of claim 10 wherein the recycling container further comprises a drain hole, said drain hole being located in the bottom of the recycling container to allow rain water and liquids to drain from the recycling container.

14. The recycling container of claim 10 wherein the recycling container further comprises a plurality of restrictors, wherein a plurality of restrictors is defined as at least one restrictor, and each restrictor of the plurality of restrictors is positioned on the inside of the recycling container, covering a hole of the plurality of holes or the slot, and allows recycling material to be passed through the hole or slot but prevents the recycling material from being extracted once inserted into the recycling container.

15. The recycling container of claim 14 wherein the recycling container further comprises a drain hole, said drain hole being located in the bottom of the recycling container to allow rain water and liquids to drain from the recycling container.

16. The recycling container of claim 1 wherein the recycling container further comprises a drain hole, said drain hole being located in the bottom of the recycling container to allow rain water and liquids to drain from the recycling container.

* * * * *